(12) United States Patent
Bulgrien

(10) Patent No.: US 10,393,230 B2
(45) Date of Patent: Aug. 27, 2019

(54) TRANSMISSION SYSTEM FOR A WORK VEHICLE

(71) Applicant: CNH Industrial America LLC, New Holland, PA (US)

(72) Inventor: Garth Harvey Bulgrien, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 341 days.

(21) Appl. No.: 15/227,708

(22) Filed: Aug. 3, 2016

(65) Prior Publication Data

US 2018/0038455 A1    Feb. 8, 2018

(51) Int. Cl.
| F16H 3/091 | (2006.01) |
| F16H 3/08 | (2006.01) |
| F16H 3/089 | (2006.01) |
| F16H 3/00 | (2006.01) |

(52) U.S. Cl.
CPC ............. *F16H 3/089* (2013.01); *F16H 3/006* (2013.01); *F16H 3/08* (2013.01); *F16H 2003/0822* (2013.01); *F16H 2200/006* (2013.01); *F16H 2200/0039* (2013.01); *F16H 2200/0043* (2013.01); *F16H 2200/0078* (2013.01); *F16H 2200/0086* (2013.01)

(58) Field of Classification Search
CPC .............................. F16H 3/091; F16H 3/0915
USPC .................................. 74/330, 331, 333, 340
See application file for complete search history.

(56) References Cited

U.S. PATENT DOCUMENTS

| 2,821,867 A | 2/1958 | Keibel |
| 4,843,551 A | 6/1989 | Milunas |
| 5,315,898 A | 5/1994 | Koyama et al. |
| 5,392,665 A * | 2/1995 | Muller ................... F16H 3/093 74/330 |

(Continued)

*Primary Examiner* — Ha Dinh Ho
(74) *Attorney, Agent, or Firm* — Rickard K. DeMille; Rebecca L. Henkel

(57) ABSTRACT

A transmission system for a work vehicle includes a transmission. The transmission includes a first shaft, a second shaft, an input shaft, an output shaft, and an input gear pair comprising a first input gear and a second input gear. The transmission includes a first input clutch configured to selectively couple the input shaft to the first shaft, and a second input clutch configured to selectively couple the input shaft to the second shaft via the input gear pair. The transmission includes an output gear pair comprising a first output gear and a second output gear, wherein the first output gear is coupled to the first shaft, or the second output gear is coupled to the output shaft. The transmission also includes a first output clutch configured to selectively couple the second output gear to the output shaft, and a second output clutch configured to selectively couple the second shaft to the output shaft. The transmission further includes a first module, wherein the first module includes a first module clutch and a first module gear pair having a first module gear and a second module gear, wherein the first module gear is coupled to the first shaft and the first module clutch is configured to selectively couple the second module gear to the second shaft, or the second module gear is coupled to the second shaft and the first module clutch is configured to selectively couple the first module gear to the first shaft.

17 Claims, 5 Drawing Sheets

(56) References Cited

U.S. PATENT DOCUMENTS

| | | | |
|---|---|---|---|
| 6,634,247 B2 * | 10/2003 | Pels | B60K 6/26 |
| | | | 74/329 |
| 6,766,705 B1 * | 7/2004 | Hall, III | F16H 3/006 |
| | | | 74/331 |
| 7,472,617 B2 * | 1/2009 | Nicklass | F16H 3/006 |
| | | | 74/331 |
| 7,954,581 B2 | 6/2011 | Tanishima | |
| 8,051,732 B2 | 11/2011 | Gitt | |
| 8,051,735 B2 | 11/2011 | Bender et al. | |
| 8,052,570 B2 | 11/2011 | Kurnazaki et al. | |
| 8,066,606 B2 | 11/2011 | Dittrich et al. | |
| 8,109,166 B2 | 2/2012 | Tsukada et al. | |
| 8,192,326 B2 | 6/2012 | Kumazaki et al. | |
| 8,205,516 B2 * | 6/2012 | Kobayashi | F16H 61/0403 |
| | | | 74/331 |
| 8,419,582 B2 | 4/2013 | Renner | |
| 8,627,736 B2 * | 1/2014 | Maerkl | F16H 3/093 |
| | | | 74/325 |
| 9,964,182 B2 * | 5/2018 | G V | F16H 3/091 |
| 2009/0264241 A1 | 10/2009 | Dittrich et al. | |
| 2009/0325763 A1 | 12/2009 | Dittrich et al. | |
| 2011/0030488 A1 * | 2/2011 | Gumpoltsberger | F16H 3/006 |
| | | | 74/331 |
| 2014/0013881 A1 | 1/2014 | Luebke et al. | |

\* cited by examiner

| CLUTCHES | | | | | |
|---|---|---|---|---|---|
| SPEED | A | B | E | L | H |
| 1 | X | | X | X | |
| 2 | X | X | | X | |
| 3 | X | X | | | X |
| 4 | | X | X | | X |

| RANGE | SPEED | CLUTCHES | | | | | | | | | | |
|---|---|---|---|---|---|---|---|---|---|---|---|---|
| | | R | O | E | S1 | S2 | IN1 | IN2 | 1&6 | 2%5 | L | H |
| 1 | 1 | X | | | X | | X | | X | | X | |
| 1 | 2 | | X | | X | | X | | X | | X | |
| 1 | 3 | X | | | | X | X | | X | | X | |
| 1 | 4 | | | X | | X | X | | X | | X | |
| 2 | 5 | X | | | X | | X | | | X | X | |
| 2 | 6 | | X | | X | | X | | | X | X | |
| 2 | 7 | X | | | | X | X | | | X | X | |
| 2 | 8 | | | X | | X | X | | | X | X | |
| 3 | 9 | X | | | X | | X | X | | | X | |
| 3 | 10 | | X | | X | | X | X | | | X | |
| 3 | 11 | X | | | | X | X | X | | | X | |
| 3 | 12 | | | X | | X | X | X | | | X | |
| 4 | 13 | X | | | X | | X | X | | | | X |
| 4 | 14 | | X | | X | | X | X | | | | X |
| 4 | 15 | X | | | | X | X | X | | | | X |
| 4 | 16 | | | X | | X | X | X | | | | X |
| 5 | 17 | X | | | X | | | X | | X | | X |
| 5 | 18 | | X | | X | | | X | | X | | X |
| 5 | 19 | X | | | | X | | X | | X | | X |
| 5 | 20 | | | X | | X | | X | | X | | X |
| 6 | 21 | X | | | X | | | X | X | | | X |
| 6 | 22 | | X | | X | | | X | X | | | X |
| 6 | 23 | X | | | | X | | X | X | | | X |
| 6 | 24 | | | X | | X | | X | X | | | X |

FIG. 6

TRANSMISSION SYSTEM FOR A WORK VEHICLE

BACKGROUND

The disclosure relates generally to a transmission system for a work vehicle.

Transmissions are used in agricultural and construction equipment to transmit power from power sources, such as internal combustion engines, to equipment for accomplishing a desired task. For example, transmissions are used to transmit power to wheels of a work vehicle. A powershift transmission is a transmission that controls the application and release of multiple clutches to maintain a torque path through the transmission while switching between gears. A powershift transmission may use countershaft arrangements to provide well-spaced speeds with small ratio steps between speeds, which is desirable for certain work vehicles, such as tractors. To achieve a larger number of speeds economically, at least two and usually three transmission stages may be arranged in series to achieve a larger number of speeds from a number of clutches and gear sets. Within each stage, two clutches may be swapped to switch between adjacent gear ratios. Some shifts between adjacent speeds require simultaneous clutch swaps in two or three stages of the transmission. These shifts are called double-swap, triple-swap, or multi-swap shifts. For example, a double-swap downshift may include a downshift in one transmission stage and a smaller upshift in another transmission stage, resulting in an overall downshift. Multi-swap shifts may have poorer shiftability (e.g., capability to provide smooth powershifts) than single-swap shifts (e.g., performing a single clutch swap within a stage to switch between adjacent gear ratios). Accordingly, the comfort and/or efficiency associated with operation of the work vehicle may be reduced.

BRIEF DESCRIPTION

In one embodiment, a transmission system for a work vehicle includes a transmission, which includes a first shaft, a second shaft, an input shaft, an output shaft, and an input gear pair comprising a first input gear and a second input gear. The transmission includes a first input clutch configured to selectively couple the input shaft to the first shaft, and a second input clutch configured to selectively couple the input shaft to the second shaft via the input gear pair. The transmission includes an output gear pair comprising a first output gear and a second output gear, wherein the first output gear is coupled to the first shaft, or the second output gear is coupled to the output shaft. The transmission includes a first output clutch configured to selectively couple the second output gear to the output shaft if the first output gear is coupled to the first shaft, or to selectively couple the first output gear to the first shaft if the second output gear is coupled to the output shaft. The transmission further includes a second output clutch configured to selectively couple the second shaft to the output shaft, and a first module. The first module includes a first module gear pair including a first module gear and a second module gear, wherein the first module gear is coupled to the first shaft, or the second module gear is coupled to the second shaft. The first module also includes a first module clutch configured to selectively couple the second module gear to the second shaft if the first module gear is coupled to the first shaft, or to selectively couple the first module gear to the first shaft if the second module gear is coupled to the second shaft.

In another embodiment, a transmission system for a work vehicle includes a transmission. The transmission includes a first shaft, a second shaft, an input shaft, an output shaft, and an input gear pair comprising a first input gear and a second input gear. The transmission includes a first input clutch configured to selectively couple the input shaft to the first shaft, and a second input clutch configured to selectively couple the input shaft to the second shaft via the input gear pair. The transmission includes an output gear pair comprising a first output gear and a second output gear, wherein the first output gear is coupled to the first shaft. The transmission also includes a first output clutch configured to selectively couple the second output gear to the output shaft, and a second output clutch configured to selectively couple the second shaft to the output shaft. The transmission further includes a first module, wherein the first module includes a first module clutch and a first module gear pair having a first module gear and a second module gear, wherein the first module gear is coupled to the first shaft and the first module clutch is configured to selectively couple the second module gear to the second shaft, or the second module gear is coupled to the second shaft and the module clutch is configured to selectively couple the first module gear to the first shaft.

In a further embodiment, a transmission system for a work vehicle includes a transmission. The transmission includes a first shaft, a second shaft, an input shaft, an output shaft, and an input gear pair comprising a first input gear and a second input gear. The transmission includes a first input clutch configured to selectively couple the input shaft to the first shaft, and a second input clutch configured to selectively couple the input shaft to the second shaft via the input gear pair. The transmission includes an output gear pair including a first output gear and a second output gear, wherein the second output gear is coupled to the output shaft. The transmission also includes a first output clutch configured to selectively couple the first output gear to the first shaft, and a second output clutch configured to selectively couple the second shaft to the output shaft. The transmission further includes a module including a module clutch and a module gear pair having a first module gear and a second module gear, wherein the first module gear is coupled to the first shaft and the module clutch is configured to selectively couple the second module gear to the second shaft, or the second module gear is coupled to the second shaft and the module clutch is configured to selectively couple the first module gear to the first shaft.

DRAWINGS

These and other features, aspects, and advantages of the present disclosure will become better understood when the following detailed description is read with reference to the accompanying drawings in which like characters represent like parts throughout the drawings, wherein:

FIG. 6 is a shift diagram corresponding to gear ratio changes on the transmission of FIG. 5.

DETAILED DESCRIPTION

The magnitude of the gear ratio change within each stage during a multi-swap shift is a major factor affecting shiftability. For example, in a transmission with 15% steps (e.g., in which the gear ratio in each lower speed is 15% greater than the gear ratio of the next higher speed), a double-swap downshift may include a 2-step downshift in one stage and a 1-step upshift in another stage, or it may include a 4-step downshift in one stage and a 3-step upshift in another stage; the latter may have poorer shiftability than the former. Certain transmissions may have triple-swap downshifts that include a downshift of 6 steps or more in one stage, while the other two stages upshift to offset all but one step of the downshift ratio change. These arrangements may be used to minimize cost and size and maximize efficiency of the transmission by using an output stage that has only two or three ratios and large ratio steps. Shiftability could be improved by using an output stage with a larger number of ratios, and as a result, smaller ratio steps within that stage. This disclosure relates to a gear and clutch arrangement that may provide a larger number of ratios with lower cost, smaller size, and higher efficiency (e.g., higher than conventional arrangements).

Figure 1:
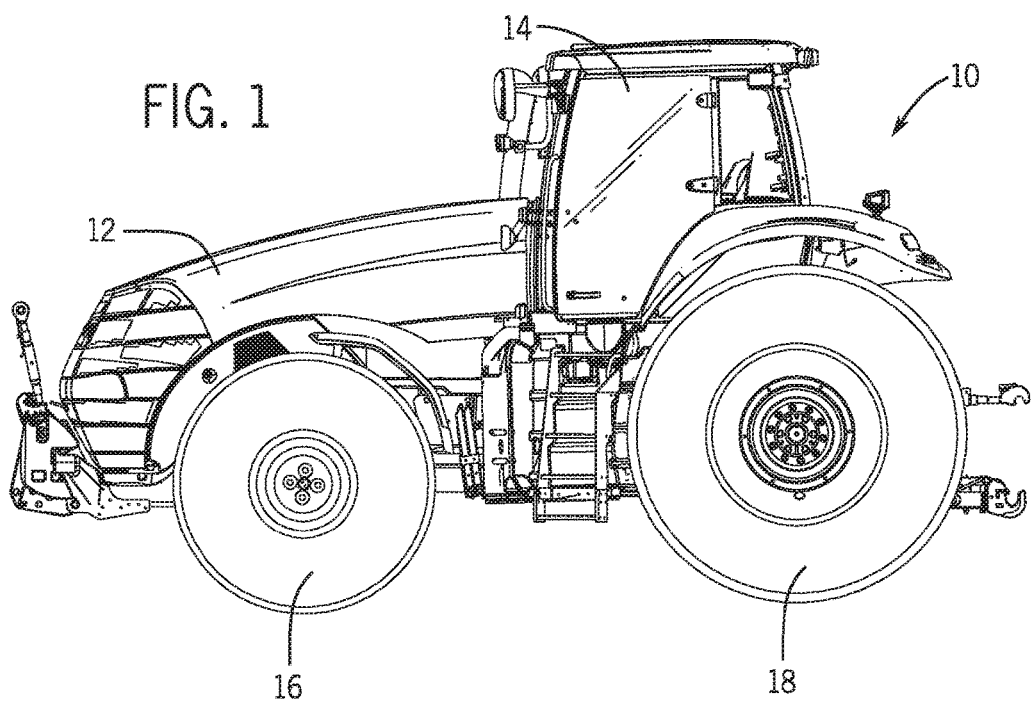
FIG. 1 is a side view of an embodiment of a work vehicle that may employ a transmission system, in accordance with the present disclosure.

With the foregoing in mind, FIG. 1 is a side view of a work vehicle 10 that may employ a transmission system. The work vehicle 10 may be any suitable type of loader, tractor, grader, backhoe, forklift, agricultural vehicle, or any other suitable vehicle that utilizes a transmission. The work vehicle 10 has a body 12 that typically houses an engine, transmission, and power train. Further, the work vehicle 10 has a cabin 14 where an operator may sit or stand to operate the work vehicle 10. The work vehicle 10 has two front wheels or tracks 16 and two rear wheels or tracks 18 that rotate to move the work vehicle 10. As may be appreciated, the work vehicle 10 may drive the wheels 16 and 18 using a transmission. For example, the work vehicle 10 may use a full powershift transmission system to transfer power from the engine to the wheels 16 and 18.

Figure 2:
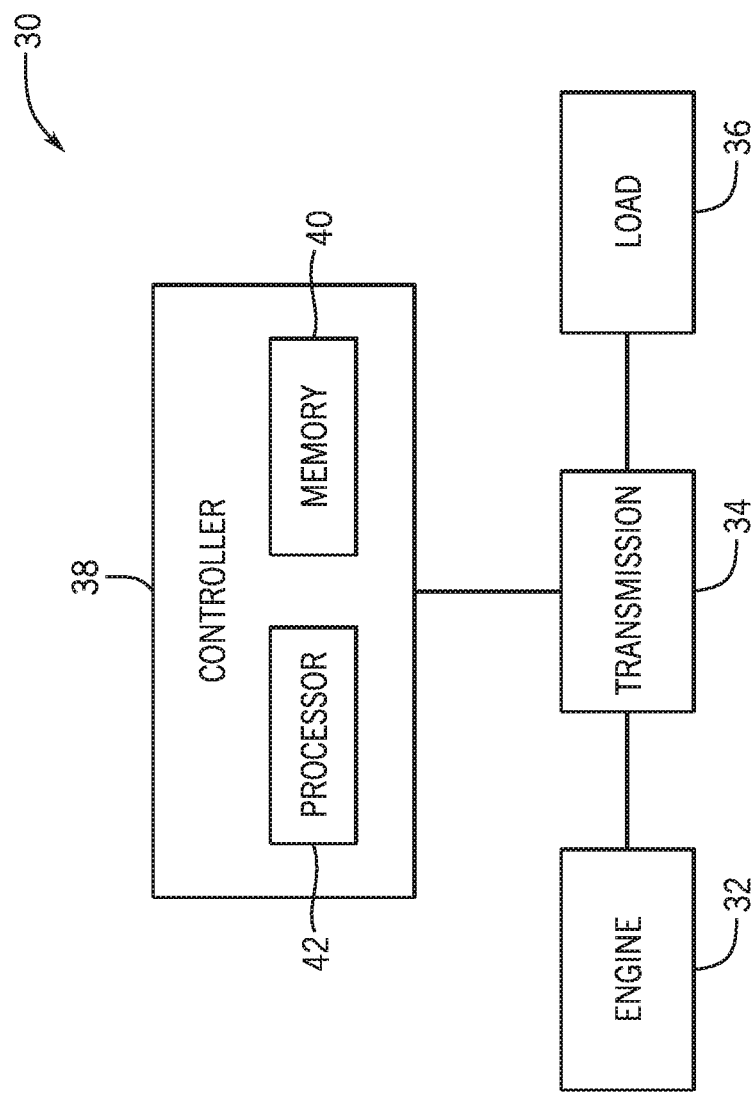
FIG. 2 is a block diagram of an embodiment of a transmission system that may be used in the work vehicle of FIG. 1, in accordance with the disclosure.

FIG. 2 is a block diagram of an embodiment of a transmission system 30 that may be used in the work vehicle 10 of FIG. 1. An engine 32 (e.g., an internal combustion engine) provides power to drive a transmission 34 of the transmission system 30. The transmission 34 may include a hydraulic system, a planetary gear unit, seals and gaskets, a torque converter, a modulator, and sensor(s), etc. Output from the transmission 34 drives a load 36, such as the wheels of the work vehicle 10. The transmission system 30 furthers include a controller 38 configured to control various systems and units within the transmission 34. As illustrated, the controller 38 includes one or more memory device(s) 40 and one or more processor(s) 42. For example, the memory device(s) 40 may include volatile memory, such as random access memory (RAM), and/or non-volatile memory, such as read-only memory (ROM), optical drives, hard disc drives, solid-state drives, or a combination thereof. Additionally, the one or more processor(s) 42 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, ASICs, and other programmable circuits. The memory device(s) 40 (e.g., non-transitory computer-readable medium/memory circuitry) may store one or more sets of instructions (e.g., processor-executable instructions) implemented to operate the transmission 34. In operation, the controller 38 uses the processor(s) 42 to execute instructions stored in the memory device(s) 40 to control the transmission 34. For example, the controller 38 may receive instructions to cause various clutches to be engaged/disengaged to cause gear ratio changes while the work vehicle 10 is moving (e.g., at different speeds).

Figures 3, 4:
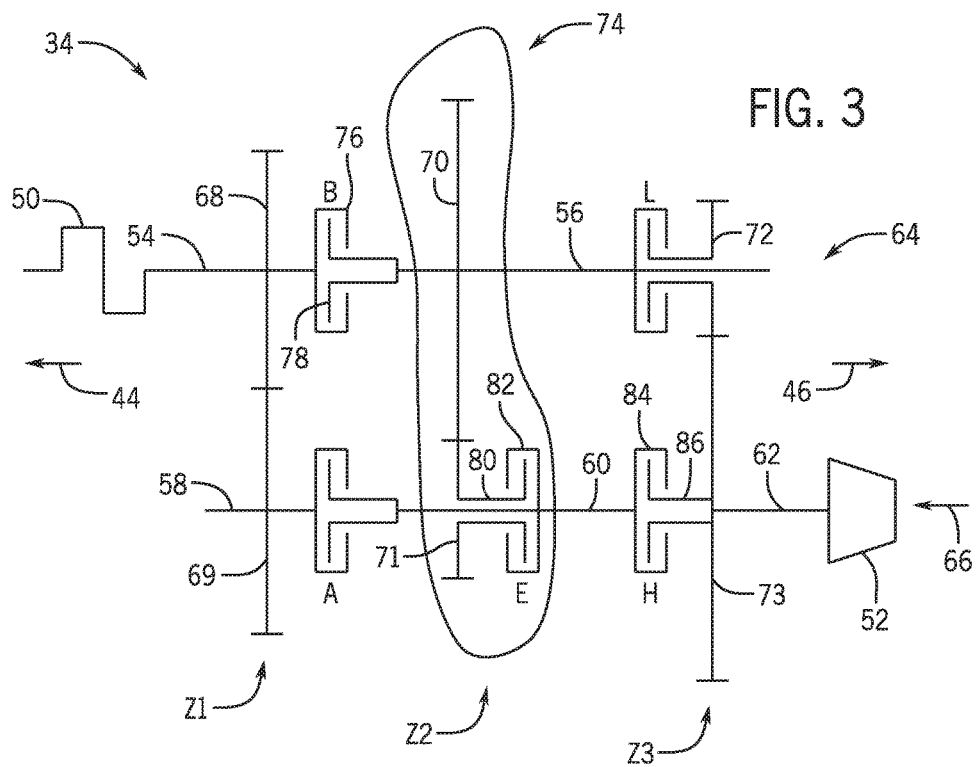
FIG. 3 is a schematic diagram of an embodiment of a transmission that may be used within the transmission system of FIG. 2.
FIG. 4 is a shift diagram corresponding to gear ratios changes on the transmission of FIG. 3.

FIG. 3 is a schematic diagram of an embodiment of a transmission 34 that may be used within the transmission system of FIG. 2. In the following descriptions, an axial direction 44 pointing toward a drive motor 50 is referred to as "front", whereas an axial direction 46 pointing toward a load 52 is referred to as "rear". An input shaft 54 is driven by the drive motor 50, and a first shaft 56 is connected to the input shaft 54 by a first input clutch B. The transmission 34 also includes a countershaft 58, a second shaft 60, and an output shaft 62 connected to the load 52. In the direction toward the rear, the second shaft 60 is connected to the countershaft 58 by a second input clutch A, and the output shaft 62 is connected to the second shaft 60 in a rotationally fixed manner via a second output clutch H. For example, the drive motor 50 could be the engine 32 and the load 52 could be the load 36 as shown in FIG. 2.

The input shaft 54 and the first shaft 56 form an input shaft arrangement 64, while the countershaft 58, the second shaft 60, and the output shaft 62 form an output shaft arrangement 66. The input shaft arrangement 64 and the output shaft arrangement 66 are axially parallel to one another. Arranged on the input shaft arrangement 64 and the output shaft arrangement 66 along the axial direction pointing toward the rear 46, are three gear pairs, an input gear pair Z1, a module gear pair Z2, and an output gear pair Z3. The input gear pair Z1 includes a first input gear 68 and a second input gear 69, the module gear pair Z2 includes a first module gear 70 and a second module gear 71, and the output gear pair includes a first output gear 72 and a second output gear 73. The module gear pair Z2 and the module clutch E form a first module 74. Along the axial direction pointing toward the rear 46, the first input clutch B is disposed between the first input gear 68 and the first module gear 70, and the output clutch L is disposed between the first module gear 70 and the first output gear 72. Along the axial direction pointing toward the rear 46, another three clutches, A, E, and H are arranged on the output shaft arrangement 66. The second input clutch A is disposed between the second input gear 69 and the second module gear 71, and a module clutch E and the second output clutch H are disposed between the second module gear 71 and the second output gear 73.

For example, the first input gear 68 is fixedly coupled (e.g., coupled such that two components rotate together) to the input shaft 54, the input shaft 54 is fixedly coupled to a housing 76 of the first input clutch B, the first shaft 56 is fixedly coupled to a friction disk 78 of the first input clutch B, and the first shaft 56 is fixedly coupled to the first module gear 70. For example, the first module gear 70 is rotatably coupled (e.g., coupled such that rotation of one component drives rotation of the other component) to the second module gear 71, the second module gear 71 is fixedly coupled to a friction disk 80 of the module clutch E, and the second shaft 60 is fixedly coupled to a housing 82 of the module clutch E. For example, the second shaft 60 is fixedly coupled to a housing 84 of the second output clutch H, the output shaft 62 is fixedly coupled to the second output gear 73, and the second output gear 73 is fixedly coupled to a friction disk 86 of the second output clutch H.

The clutches described herein may be any suitable type (s), including dry clutch(es), wet clutch(es), single/multi plate clutch(es), dog clutch(es), centrifugal clutch(es), pneumatic and hydraulic clutch(es), electromagnetic clutch, or any combination thereof, among other types of clutches. Furthermore, each of the clutches may be configured to selectively couple a gear to a shaft or selectively couple a shaft to another shaft upon receiving a control signal from the controller. The described system of gears and shafts can be actuated with the five clutches (B, L, A, E, and H) to achieve different gear ratios (e.g., speeds) between the input shaft 54 and the output shaft 62. For example, the clutches may be controlled (e.g., via the controller) to control the engagement/disengagement of each clutch with its respective gear(s) and/or shaft(s) to transfer power along different power flow paths to achieve different speeds, as discussed in detail below.

FIG. 4 is a shift diagram corresponding to gear ratio changes on the transmission of FIG. 3, with four forward speeds from Speeds 1 to 4. Here, the Speeds 1 to 4 are illustrated in successive rows, with each speed achievable via a power flow path through the transmission 34 of FIG. 3. For example, Speed 1 may be achieved by engaging clutches A, E, and L (e.g., designated as 'X'), Speed 2 may be achieved by engaging clutches B and L, and so on with the engaged clutches designated with an "X". Furthermore, the gears in the transmission 34 are arranged such that when sequential power-shifts are performed from Speed 1 to Speed 4 (e.g., down the rows), the total gear ratio of the transmission 34 decreases. As each of the Speeds 1 to 4 is discussed below, it should be noted that the 5 clutches (A, B, E, L, and H) and the gears are arranged such that three clutches are engaged to complete a power flow or ratio path, but two of these three clutches remain engaged when shifting between adjacent ranges (e.g., from Speed 1 to Speed 2, from Speed 2 to Speed 3, and so on). In addition, the configuration/arrangement of the transmission 34 that employs five clutches (A, B, E, L, and H) and three gear pairs (Z1, Z2, and Z3) facilitates performance of sequential power-shifts from one speed to the next with only a single-clutch swap. For example, when a power-shift is performed to engage the clutches for shifting from Speed 1 to Speed 2, both of the clutches A and L remain engaged, and only a single swap takes place by disengaging the module clutch E and engaging the first input clutch B. This unique configuration/arrangement of the transmission 34 may enhance shiftability, as compared to transmission having four clutches and three gear sets that perform double-clutch swaps when shifting between certain gears. Accordingly, the comfort and/or efficiency associated with operation of the work vehicle 10 may be enhanced.

Each of the Speeds 1 to 4 in successive rows shown represents a power flow path through the transmission 34 of FIG. 3. Below, each of the flow paths is discussed in detail. During operation, the engine 32 drives the input shaft 54 to rotate. The countershaft 58 is rotatably coupled to the input shaft 54 via the input gear pair Z1. Accordingly, the countershaft 58 rotates as the input shaft 54 rotates. When the second input clutch A is engaged, the second shaft 60 is fixedly coupled to the counter shaft 58, such that the countershaft 58 drives the second shaft 60 to rotate with the countershaft 58. When the module clutch E is engaged, the second shaft 60 is fixedly coupled to the second module gear 71, which is rotatably coupled to the first module gear 70. Since the first shaft 56 and the first module gear 70 are fixedly coupled, rotation of the second shaft 60 also drives the first shaft 56 to rotate through the coupling of the module gears 70 and 71. Furthermore, because the first output clutch L is engaged, the first output gear 72 is fixedly coupled to the first shaft 56 such that the first output gear 72 is driven to rotate with the first shaft 56. Because the output shaft 62 is fixedly coupled to the second output gear 73, the output shaft 62 rotates as the first shaft 56 rotates via the rotatably coupled first and second output gears 72 and 73. The output shaft 62 outputs power to the load 52. Following the power flow path of Speed 1, gears pairs Z1, Z2, and Z3 are contributing to the total transmission gear ratio.

Shifting from Speed 1 to Speed 2, the second input clutch A remains engaged, but it is not in the power flow path (e.g., not transmitting torque), the module clutch E is disengaged, and the first input clutch B is engaged. While the first input clutch B is engaged, the first shaft 56 is fixedly coupled to the input shaft 54 such that the first shaft 56 rotates as the input shaft 54 is driven to rotate by the drive motor 50. Because the first output clutch L is engaged, the output shaft 62 is rotatably coupled to the first shaft 56 via the output gear pair Z3. Following the power flow path of Speed 2, only the output gear pair Z3 is contributing to the total transmission gear ratio.

Shifting from Speed 2 to Speed 3, the first input clutch B remains engaged, but it is not in the power flow path, the second input clutch A remains engaged and is now in the power flow path, the first output clutch L is disengaged, and the second output clutch H is engaged. Because the second input clutch A is engaged, the second shaft 60 is fixedly coupled to the countershaft 58, which is driven to rotate by the input shaft 54 via the coupling provided by the input gear pair Z1. Because the output clutch H is engaged, the output shaft 62 is fixedly coupled to the second shaft 60, thereby driving the load 52 to rotate. Following the power flow path of Speed 3, only the input gear pair Z1 is contributing to the total transmission gear ratio.

Shifting form Speed 3 to Speed 4, the first input clutch B and the second output clutch H remain engaged, the second input clutch A is disengaged, and the first module clutch E is engaged. Because the first input clutch B is engaged, the first shaft 56 is fixedly coupled to the input shaft 54. Because the module clutch E is engaged, the second module gear 71 is fixedly coupled to the second shaft 60. Accordingly, the second shaft 60 rotates with the first shaft 56 via the coupling provided by the module gear pair Z2. Because the second output clutch H is engaged, the output shaft 62 is fixedly coupled to the second shaft 60, thereby driving the load 52 to rotate. Following the power flow path of Speed 4, only the module gear pair Z2 is contributing to the total transmission gear ratio.

As described above, all of the shifts are single-clutch swaps. Furthermore, it may be appreciated that although the transmission 34 of FIG. 3 is configured to provide four speeds, six speeds, eight speeds or more may be provided by adding one or more modules. For example, the transmission 34 may provide an increased number of speeds, from four speeds to six speeds, by adding another module to the transmission 34, including a module gear pair and a module clutch, similar to the first module 74 described above. As another example, the transmission 34 may provide an increased number of speeds, from four speeds to eight speeds, by adding two additional modules to the transmission 34. A schematic diagram of the above mentioned six-speed transmission is discussed below.

Figure 5:
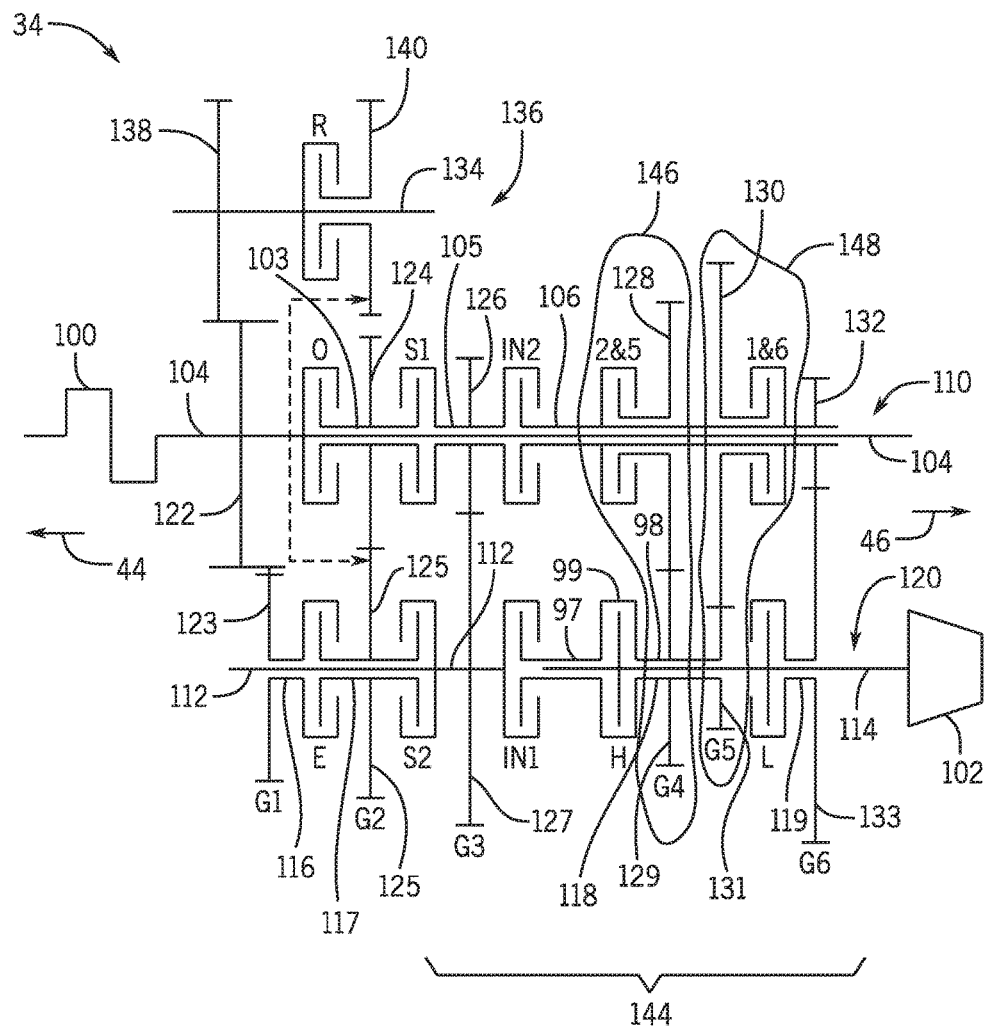
FIG. 5 is a schematic diagram of another embodiment of a transmission that may be used within the transmission system of FIG. 2.

FIG. 5 is a schematic diagram of another embodiment of a transmission 34 that may be used within the transmission system of FIG. 2. In the following descriptions, the axial direction 44 pointing toward a drive motor 100 is referred to as "front", whereas the axial direction 46 pointing toward a load 102 is referred to as "rear". For example, the drive motor 100 could be the engine 32 and the load 102 could be the load 36 as shown in FIG. 2. An input shaft 104 is driven by the drive motor 100, a shaft 103 is selectively fixedly coupled to the input shaft 104 by an odd clutch O, a shaft 105 is selectively fixedly coupled to the shaft 103 by an intermediate clutch S1, and a first shaft 106 is selectively fixedly coupled to the shaft 105 by a clutch IN2 or first input clutch. As illustrated, the input shaft 104 is an inner shaft that is concentrically disposed within the shaft 103, the shaft 105, and the first shaft 106, which are hollow. The input shaft 104, the shaft 103, the shaft 105, and the first shaft 106 form an input shaft arrangement 110. The transmission 34 also includes a countershaft segment 112 and an output shaft 114 connected to the load 102. As illustrated, the countershaft segment 112 is an inner shaft that is concentrically disposed within an outer countershaft segment 116 and an outer countershaft segment 117, which are hollow outer layers circumferentially disposed about the countershaft segment 112. The outer countershaft segment 116 is selectively fixedly coupled to the countershaft segment 117 by an even clutch E. The outer countershaft segment 117 is selectively fixedly coupled to the countershaft segment 112 by an intermediate clutch S2. The output shaft 114 is an inner shaft that is concentrically disposed within a shaft 119 which is hollow. The shaft 119 is selectively fixedly coupled to the output shaft 114 by a clutch L or first output clutch. A second shaft 118 is selectively fixedly coupled to the output shaft 114 by a clutch H or second output clutch. The countershaft segment 112 is selectively fixedly coupled to the shaft 118 by a clutch IN 1 or second input clutch. The countershaft segment 112, the coaxially arranged shaft 114, the second shaft 118, and the shaft 119 form an output shaft arrangement 120. It should also be noted that a shaft may refer to a collection of components that are constrained to rotate together (e.g., shaft(s) fixedly coupled to a housing of a clutch). For example, the second shaft 118 may include a collection of a shaft 97, a shaft 98, and a housing 99 of the clutch H, wherein the shafts 97 and 98, and the housing 99 are constrained to rotate together.

The input arrangement 110 and the output arrangement 120 are parallel to one another. Arranged on the input shaft arrangement 110 and the output shaft arrangement 114 along the axial direction pointing toward the rear 46, are six gear pairs G1, G2, G2, G3, G4, G5, and G6 for forward gears that are each formed by respective pairs of gears 122/123, 124/125, 126/127, 128/129, 130, 131, and 132/133. In addition, along the axial direction pointing toward the rear 46, five clutches, O, S1, IN2 or first input clutch, 2&5 or first module clutch, 1&6 or second module clutch are arranged on the input shaft arrangement 110. The odd clutch O is disposed between the gears 122 and 124, the intermediate clutch S1 between the gear 124 and the gear 126 or first input gear, the first input clutch IN2 and the first module clutch 2&5 between the first input gear 126 and the gear 128 or first module gear, and the second module clutch 1&6 between the gear 130 or third module gear and the gear 132 or first output gear. Along the axial direction pointing toward the rear 46, another five clutches, E, S2, IN1 or second input clutch, H or second output clutch, and L or first output clutch are arranged on the output shaft arrangement 120. The even clutch E is disposed between the gear 123 and gear 125, the intermediate clutch S2 between the gear 125 and gear 127, the second input clutch IN1 and the second output clutch H between the gear 127 or second input gear and gear 129 or second module gear, and the first output clutch L between the gear 131 or fourth module gear and gear 133 or second output gear.

In addition, the transmission 34 further includes a reverse shaft 134 forming a reverse shaft arrangement 136. The reverse shaft arrangement 136 is parallel to the input arrangement 110 and to the output arrangement 120. Arranged on the reverse shaft arrangement 136 and along the axial direction pointing toward the rear 46 are a gear 138 and a clutch R, which is configured to couple a gear 140 to the reverse shaft 134. The gear 138 is connected to the gear 122, which is connected in a rotationally fixed manner to the input shaft 104. The gear 140 is rotatably coupled to the gear 125 and, therefore, to the gear 124.

The clutches described herein may be any suitable type(s) including dry clutch(es), wet clutch(es), single/multi plate clutch(es), dog clutch(es), centrifugal clutch(es), pneumatic and hydraulic clutch(es), electromagnetic clutch(es), or any combination thereof. Furthermore, each of the clutches may be configured to selectively couple a gear to a shaft or selectively couple a shaft to another shaft upon receiving a control signal from the controller. The described system of gears and shafts can be actuated with the eleven clutches (O, S1, IN2, 2&5, 1&6, E, S2, IN1, H, L, and R) to achieve different gear ratios (e.g., speeds) between the input shaft 104 and the output shaft 114. For example, the clutches may be controlled (e.g., via the controller) to control the engagement/disengagement of each clutch with its respective gear(s) and/or shaft(s) to transfer power along different power flow paths to achieve different speeds, as discussed in detail below.

Furthermore, a portion of the concepts described herein is focused on a 6-range stage that employs six clutches (IN2, IN1, 2&5, H, 1&6, and L) and four gear pairs (G3, G4, G5, and G6), grouped as a main transmission stage 144. The main transmission stage 144 includes the first input gear 126 and the second input gear 127, the first input clutch IN2 and the second input clutch IN1, the first output gear 132 and the second output gear 133, and the first output clutch L and the second output clutch H. The main transmission stage 144 includes a first module 146, in which the first module 146 includes the first module gear 128, the second module gear 129, and a first module clutch 2&5. The main transmission stage 144 also includes a second module 148, in which the second module 148 includes the third module gear 130, the fourth module gear 131, and a second module clutch 1&6.

FIG. 6 is a shift diagram corresponding to gear ratio changes of the transmission of FIG. 5, with twenty-four forward speeds from Speeds 1 to 24 in six speed ranges from Ranges 1 to 6. Here, the Speeds 1 to 24 are illustrated in successive rows with each speed achievable via a respective power flow path through the transmission 34 of FIG. 5. For example, Speed 1 may be achieved by engaging clutches O, S1, IN1, 1&6, and L (e.g., designated as 'X'), Speed 2 may be achieved by engaging clutches E, S1, IN1, 1&6, and L, and so on with the engaged clutches designated with an "X" (e.g., no "X" as not engaged). Furthermore, the gears in the transmission 34 are arranged such that when sequential power-shifts are performed from Speed 1 to Speed 24 (e.g., down the rows), the total gear ratio of the transmission 34 decreases. In addition, in the main transmission stage 144, Speeds 1 to 24 may be grouped into six different speed range sections (e.g., designated as Ranges 1 to 6 in the first column of FIG. 6). For example, a first speed range, Range 1, includes Speeds 1 to 4, wherein clutches IN1, 1&6, and L are engaged. In addition, a second speed range, Range 2, includes Speeds 5 to 8, wherein clutches IN1, 2&5, and L are engaged, and so on with the speed ranges designated in the first column of FIG. 6 and the engaged clutches designated with an "X".

As each of the Speeds 1 to 24 is discussed below, it should be noted that the 6 clutches (IN2, IN1, 2&5, H, 1&6, and L) and the gears (126, 127, 128, 129, 130, 131, 132, and 133) of the main transmission section 114 are arranged such that three clutches are engaged to complete a power flow path through the main transmission section 144, but two of these three clutches remain engaged when shifting between adjacent speed ranges (e.g., from Range 1 to Range 2, Range 2 to Range 3, and so on). In other words, the speed ranges are controlled by single-clutch swaps in the main transmission section 144. The configuration/arrangement of the main transmission section 144 that employs six clutches (IN2, IN1, 2&5, H, 1&6, and L) and four gear pairs (G3, G4, G5, and G6) facilitates performance of sequential power-shifts from one speed to the next with only a single-clutch swap. For example, when a shift is performed to engage the clutches/gears in the main transmission section 144 going from Range 1 to Range 2 (e.g., Speed 4 to Speed 5), both clutches IN1 and L remain engaged, and only a single swap takes place by disengaging clutch 1&6 and engaging clutch 2&5. It is worth noting that in addition to the gear swaps taking place within the main transmission section 144, there are two other gear swaps, disengaging/engaging even clutch E and disengaging/engaging the odd clutch O, and disengaging/engaging intermediate clutch S2 and disengaging/engaging intermediate clutch S1. As such, sequential shifts from one range section to the next may be achieved with triple clutch swaps throughout the whole transmission 34, but there is only a single clutch swap in the main transmission section 144. This unique configuration/arrangement of the main transmission section 144 may enhance shiftability, as compared to a main transmission section having four clutches and three gear sets that perform double-clutch swaps when shifting between certain gears. Accordingly, the comfort and/or efficiency associated with operation of the work vehicle 10 may be enhanced.

Each of the Speeds 1 to 24 in successive rows shown in FIG. 6 represents a power flow path through the transmission 34 of FIG. 5. Below, each of the flow paths is discussed in detail. During operation, the engine 32 drives the input shaft 104 to rotate. The odd clutch O selectively couples the input shaft 104 to a shaft 103, which is fixedly coupled to the gear 124. The intermediate clutch S1 selectively couples the shaft 103 to a shaft 105, which is fixedly coupled to the first input gear 126. As such, with the clutches O and S1 engaged, the shaft 105 is fixedly coupled to the input shaft 104 such that the shaft 105 is driven to rotate with the input shaft 104. Because the first input gear 126 is fixedly coupled to the shaft 105, the first input gear 126 rotates with the shaft 105. Since the countershaft segment 112 and the second input gear 127 are fixedly coupled to one another, rotation of the first input gear 126 also drives the countershaft segment 112 to rotate through the rotatably coupled first input gear 126 and second input gear 127. When the second input clutch IN1 is engaged, the second shaft 118 is fixedly coupled to the countershaft segment 112, such that the countershaft segment 112 drives the second shaft 118 to rotate with the countershaft segment 112. Since the second shaft 118 and the fourth module gear 131 of the second module 148 are fixedly coupled, rotation of the second shaft 118 drives the fourth module gear 131 of the second module 148 to rotate. With the second module clutch 1&6 engaged, the third module gear 130 of the second module 148 is fixedly coupled to the first shaft 106, and the third module gear 130 of the second module 148 is driven to rotate with the second shaft 118 through the rotatably coupled third module gear 130 and fourth module gear 131. Accordingly, the first shaft 106 is driven to rotate. Because the first output gear 132 is fixedly coupled to the first shaft 106, the first output gear 132 rotates with the first shaft 106. Because the shaft 119 and the second output gear 133 are fixedly coupled, rotation of the first shaft 106 also drives the shaft 119 to rotate through the rotatably coupled first output gear 132 and second output gear 133. When the first output clutch L is engaged, the output shaft 114 is fixedly coupled to the shaft 119 such that the output shaft 114 rotates with the shaft 119. The output shaft 114 outputs power to the load 102. Following the power flow path of Speed 1 in Range 1, gears pairs G3, G5, and G6 are contributing to the total transmission gear ratio.

Prior to the discussion of the power flow paths of Speeds 2 to 4 in Range 1, it should be noted that since the same clutches of the main transmission section 144 (e.g., IN1, 1&6, and L) are engaged, the power flow path through the main transmission section 144 (e.g., the power flow path from the countershaft segment 112 to the output shaft 114) of Speeds 2 to 4 is identical to that of Speed 1. As such, the discussion of Speeds 2 to 4 will mainly focus on the power flow paths from the input shaft 104 to the countershaft segment 112.

Shifting from Speed 1 to Speed 2, the odd clutch O is disengaged, and the even clutch E is engaged. While the even clutch E is engaged, the outer countershaft segment 117 is fixedly coupled to the outer countershaft segment 116 such that the outer countershaft segment 117 rotates with the outer countershaft segment 116, which rotates with the input shaft 104 through the rotatably coupled gears 122 and 123. The gear 125 is fixedly coupled to the outer countershaft segment 117 such that the gear 125 rotates with the outer countershaft segment 117. While the intermediate clutch S1 is engaged, the shaft 103 and the shaft 105 are fixedly coupled, and the shaft 105 is driven to rotate with the outer countershaft segment 117 through the rotatably coupled gears 124 and 125. The countershaft segment 112 is driven to rotate with the shaft 105 through the rotatably coupled gears 126 and 127. The power flow path continues along the same path through the main transmission section 144 (e.g., from the countershaft segment 112 to the output shaft 114), as set forth above in Speed 1. Following the power flow path of Speed 2 in Range 1, gears pairs G1, G2, G3, G5, and G6 are contributing to the total transmission gear ratio.

Shifting from Speed 2 to Speed 3, the even clutch E is disengaged, the odd clutch O is engaged, the intermediate clutch S1 is disengaged, and the intermediate clutch S2 is engaged. While the odd clutch O is engaged, the shaft 103 is fixedly coupled to the input shaft 104 such that the shaft 103 rotates with the input shaft 104. The gear 124 is fixedly coupled to the shaft 103. While the intermediate clutch S2 is engaged, the countershaft segment 112 is fixedly coupled to the outer countershaft segment 117 such that the countershaft segment 112 rotates with the outer countershaft segment 117 and is driven to rotate with shaft 103 through the rotatably coupled gears 124 and 125. The power flow path continues along the same path through the main transmission section 144 (e.g., from the countershaft segment 112 to the output shaft 114), as set forth above in Speed 1. Following the power flow path of Speed 3 in Range 1, gears pairs G2, G5 and G6 are contributing to the total transmission gear ratio.

Shifting form Speed 3 to Speed 4, the odd clutch O is disengaged, and the even clutch E is engaged. While the even clutch E is engaged, the outer countershaft segment 117 is fixedly coupled to the countershaft segment 116 such that the outer countershaft segment 117 rotates with the countershaft segment 116 and rotates with the input shaft 104 through the rotatably coupled gears 122 and 123. With the intermediate clutch S2 engaged, the countershaft segment 112 is fixedly coupled to the outer countershaft segment 117 such that the countershaft segment 112 rotates with outer the countershaft segment 117. The power flow path will be completed following the same path in the main transmission section 144 (e.g., from the countershaft segment 112 to the output shaft 114), as set forth above in Speed 1. Following the power flow path of Speed 4 in Range 1, gears pairs G1, G5, and G6 are contributing to the total transmission gear ratio.

It may also be appreciated that within the transmission 34, shifting up gears (e.g., consecutive increments from Speeds 1 to 2, 2 to 3, 3 to 4 and so on) involves engaging the clutches in an alternating fashion such that the clutches O and E are alternatively engaged in every upshift, and the clutches S1 and S2 are alternatively engaged in every other upshift. For example, all of the odd number speeds (e.g., Speeds 1, 3, 5, 7, etc.) have the odd clutch O engaged, while all of the even number speeds (e.g., Speeds 2, 4, 6, 8, etc.) have the even clutch E engaged. As such, shifting up gears involves alternating engagement of the odd clutch O and the even clutch E, thereby causing the corresponding power flow paths to alternate with every upshift. However, the intermediate clutch S1 is engaged in both Speeds 1 and 2, and the intermediate clutch S2 is engaged in both Speeds 3 and 4; therefore, up shifting involves the alternating engagement of the intermediate clutch S1 and the intermediate clutch S2 with every other upshift, thereby causing the corresponding power flow paths to alternate with every other upshift. Such clutch engagements are carried out in the same alternating fashion through all of the Speeds 1 to 24 in Ranges 1 to 6. Hence, the flow paths through the transmission 34 upstream of the main transmission section 144 for each of the Speeds 5 to 24 follow the paths described above.

Shifting from Speed 4 of Range 1 to Speed 5 of Range 2, the clutches E, S2 and 1&6 are disengaged, and the clutches O, S1, and 2&5 are engaged. As such, a triple-clutch swap is performed in the transmission 34; however, only a single-clutch swap is performed in the main transmission section 144. When clutches O and S1 are engaged, the power flow path from the input shaft 104 to the second shaft 112 is identical to that of Speed 1. When the second input clutch IN1 is engaged, the second shaft 118 is fixedly coupled to the countershaft segment 112, such that the countershaft segment 112 drives the second shaft 118 to rotate with the countershaft segment 112. The first module clutch 2&5 is engaged such that the first module gear 128 of the first module 146 is fixedly coupled to the first shaft 106. The first shaft 106 rotates with the second shaft 118 through the rotatably coupled first module gear 128 and second module gear 129 of the first module 146. With the first output clutch L engaged, the output shaft 114 is fixedly coupled to the shaft 119 and rotates with the first shaft 106 through the rotatably coupled first output gear 132 and second output gear 133. The output shaft 114 outputs power to the load 102. Following the power flow path of Speed 5 in Range 2, gears pairs G3, G4, and G6 are contributing to the total transmission gear ratio.

Shifting from Speed 5 to Speed 6, the configuration of clutches in the main transmission section 144 remains the same (e.g., IN1, 2&5, and L are engaged), the odd clutch O is disengaged, the even clutch E is engaged, and the power flow path from input shaft 104 to countershaft segment 112 is identical to that set forth above for shifting from Speed 1 to Speed 2. The power flow path will be completed following the same path in the main transmission section 144 (e.g., from the countershaft segment 112 to the output shaft 114), as set forth above in Speed 5. Following the power flow path of Speed 5 in Range 2, gears pairs G1, G2, G3, G4, and G6 are contributing to the total transmission gear ratio.

Shifting from Speed 6 to Speed 7, the even clutch E is disengaged, the odd clutch O is engaged, the intermediate clutch S1 is disengaged, the intermediate clutch S2 is engaged, and the power flow path from input shaft 104 to countershaft segment 112 is identical to that set forth above for shifting from Speed 2 to Speed 3. The power flow path will be completed following the same path in the main transmission section 144 (e.g., from the countershaft segment 112 to the output shaft 114), as set forth above in Speed 5. Following the power flow path of Speed 7, gears pairs G2, G4, and G6 are contributing to the total transmission gear ratio.

Shifting from Speed 7 to Speed 8, the odd clutch O is disengaged, the even clutch E is engaged, and the power flow path from input shaft 104 to countershaft segment 112 is identical to that set forth above for shifting from Speed 3 to Speed 4. The the power flow path will be completed following the same path in the main transmission section 144 (e.g., from the countershaft segment 112 to the output shaft 114), as set forth above in Speed 5. Following the power flow path of Speed 8, gears pairs G1, G4, and G6 are contributing to the total transmission gear ratio.

Shifting from Speed 8 of Range 2 to Speed 9 of Range 3, the clutches E, S2, and 2&5 are disengaged, and the clutches O, S1, and IN2 are engaged. As such, a triple-clutch swap is performed in the transmission 34; however, only a single-clutch swap is performed in the main transmission section 144. The power flow path from the input shaft 104 to the shaft 105 of Speed 9 is identical to that of Speed 1 (e.g., clutches, O and S1 are engaged), and hence is not discussed separately here. It should be noted that although the second input clutch IN1 remains engaged, it is not in the power flow path (e.g., not transmitting torque). While the first input clutch IN2 is engaged the first shaft 106 is fixedly coupled to the shaft 105 such that the first shaft 106 rotates with the shaft 105. While the first output clutch L is engaged, the output shaft 114 is fixedly coupled to the shaft 119 such that the output shaft 114 rotates with the shaft 119 and rotates with the first shaft 106 through the rotatably coupled first output gear 132 and second output gear 133. The output shaft 114 outputs power to the load 102. Following the power flow path of Speed 9, only the gear pair G6 is contributing to the total transmission gear ratio.

Shifting from Speed 9 to Speed 10, the configuration of clutches in the main transmission section 144 remains the same (e.g., clutches IN1, IN2, and L are engaged), the odd clutch O is disengaged, the even clutch E is engaged, and the power flow path from the input shaft 104 to the shaft 105 is identical to that set forth above for shifting from Speed 1 to Speed 2. It should be noted that although the second input clutch IN1 remains engaged, it is not in the power flow path (e.g., not transmitting torque). The power flow path will be completed following the same path in the main transmission section 144 (e.g., from the countershaft segment 105 to the output shaft 114), as set forth above in Speed 9. Following the power flow path of Speed 10, the gear pairs G1, G2, and G6 are contributing to the total transmission gear ratio.

Shifting from Speed 10 to Speed 11, the even clutch E is disengaged, the odd clutch O is engaged, the intermediate clutch S1 is disengaged, the intermediate clutch S2 is engaged, and the power flow path from the input shaft 104 to the countershaft segment 112 is identical to that set forth above for shifting from Speed 2 to Speed 3. Because the countershaft segment 112 and the second input gear 127 are fixedly coupled to one another, the second input gear 127 is driven to rotate with with countershaft segment 112. Since the shaft 105 and the gear 126 are fixedly coupled to one another, the rotation of the second input gear 127 also drives the shaft 105 to rotate through the rotatably coupled first input gear 126 and second input gear 127. The power flow path from the shaft 105 to the output shaft 114 is identical to that of Speed 9 (e.g., clutch L is engaged and the output shaft 114 outputs power to the load 102). Following the power flow path of Speed 11, the gear pairs G2, G3, and G6 are contributing to the total transmission gear ratio.

Shifting from Speed 11 to Speed 12, the odd clutch O is disengaged, the even clutch E is engaged, and the power flow path from the input shaft 104 to the countershaft segment 112 is identical to that set forth above for shifting from Speed 3 to Speed 4. The power flow path from the countershaft 112 to the shaft 105 is identical to that set forth above for shifting from Speed 10 to Speed 11. The power flow path from the shaft 105 to the output shaft 114 is identical to that of Speed 9 (e.g., clutch L is engaged and the output shaft 114 outputs power to the load 102). Following the power flow path of Speed 12, the gear pairs G1, G3, and G6 are contributing to the total transmission gear ratio.

Shifting from Speed 12 of Range 3 to Speed 13 of Range 4, the clutches E, S2, and L are disengaged, and clutches O, S1, and H are engaged. As such, a triple-clutch swap is performed in the transmission 34; however, only a single-clutch swap is performed in the main transmission section 144. The power flow path from the input shaft 104 to the countershaft segment 112 of Speed 13 is identical to that of Speed 1 (e.g., clutches O and S1 are engaged), and hence is not discussed separately here. The first input clutch IN2 remains engaged but it is not in the power flow path (e.g., not transmitting torque). Since the second input clutch IN1 remains engaged, the second shaft 118 is fixedly coupled to the countershaft segment 112. When the second output clutch H is engaged, the output shaft 114 is fixedly coupled to the second shaft 118, such that the output shaft 114 rotates with the second shaft 118 and outputs power to the load 102. Following the power flow path of Speed 13, only the gear pair G3 is contributing to the total transmission gear ratio.

Shifting from Speed 13 to Speed 14, the configuration of clutches in the main transmission section 144 remains the same (e.g., IN1, IN2, and H are engaged), the odd clutch O is disengaged, the even clutch E is engaged, and the power flow path from the input shaft 104 to the countershaft segment 112 is identical to that set forth above for shifting from Speed 1 to Speed 2. The rest of the power flow path will be completed following the same path in the main transmission section 144 (e.g., from the countershaft segment 112 to the output shaft 114), as set forth above in Speed 13. Following the power flow path of Speed 14, the gear pairs G1, G2, and G3 are contributing to the total transmission gear ratio.

Shifting from Speed 14 to Speed 15, the even clutch E is disengaged, the odd clutch O is engaged, the intermediate clutch S1 is disengaged, the intermediate clutch S2 is engaged, and the power flow path from the input shaft 104 to the countershaft segment 112 is identical to that set forth above for shifting from Speed 2 to Speed 3. The rest of the power flow path will be completed following the same path in the main transmission section 144 (e.g., from the countershaft segment 112 to the output shaft 114), as set forth above in Speed 13. Following the power flow path of Speed 15, only the gear pair G2 is contributing to the total transmission gear ratio.

Shifting from Speed 15 to Speed 16, the odd clutch O is disengaged, the even clutch E is engaged, and the power flow path from the input shaft 104 to the countershaft segment 112 is identical to that set forth above for shifting from Speed 3 to Speed 4. The rest of the power flow path will be completed following the same path in the main transmission section 144 (e.g., from the countershaft segment 112 to the output shaft 114), as set forth above in Speed 13. Following the power flow path of Speed 16, only the gear pair G1 is contributing to the total transmission gear ratio.

Shifting from Speed 16 of Range 4 to Speed 17 of Range 5, the clutches E, S2, and IN1 are disengaged, and the clutches O, S1, and 2&5 are engaged. As such, a triple-clutch swap is performed in the transmission 34; however, only a single-clutch swap is performed in the main transmission section 144. With the clutches O and S1 engaged, the power flow path from the input shaft 104 to the shaft 105 is identical to that of Speed 1. Since the first input clutch 1N2 remains engaged, the first shaft 106 is fixedly coupled to the shaft 105. When the first module clutch 2&5 is engaged, the first module gear 128 of the first module 146 is fixedly coupled to the first shaft 106 such that the first module gear 128 rotates with the first shaft 106. The second module gear 129 of the first module 146 is fixedly coupled to the second shaft 118. With the second output clutch H engaged, the output shaft 114 is fixedly coupled to the second shaft 118 such that the output shaft 114 rotates together with the first shaft 106 through the rotatably coupled first module gear 128 and second module gear 129 of the first module 146. The shafts 114 outputs power to the load 102. Following the power flow path of Speed 17, only the gear pair G4 is contributing to the total transmission gear ratio.

Shifting from Speed 17 to Speed 18, the configuration of clutches in the main transmission section 144 remains the same (e.g., 1N2, 2&5, and H are engaged), the odd clutch O is disengaged, and the even clutch E is engaged. While the even clutch E is engaged, the power flow path from the input shaft 104 to the shaft 105 is identical to that set forth above for shifting from Speed 1 to Speed 2. The power flow path will be completed following the same path in the main transmission section 144 (e.g., from the shaft 105 to the output shaft 114), as set forth above in Speed 17. Following the power flow path of Speed 18, the gear pairs G1, G2, and G4 are contributing to the total transmission gear ratio.

Shifting from Speed 18 to Speed 19, the even clutch E is disengaged, the odd clutch O is engaged, the intermediate clutch S1 is disengaged, the intermediate clutch S2 is engaged, and the power flow path from the input shaft 104 to the shaft 105 is identical to that set forth above for shifting from Speed 10 to Speed 11. The rest of the power flow path will be completed following the same path in the main transmission section 144 (e.g., from the shaft 105 to the output shaft 114), as set forth above in Speed 17. Following the power flow path of Speed 19, the gear pairs G2, G3, and G4 are contributing to the total transmission gear ratio.

Shifting from Speed 19 to Speed 20, the odd clutch O is disengaged, the even clutch E is engaged, and the power flow path from the input shaft 104 to the shaft 105 is identical to that set forth above for shifting from Speed 11 to Speed 12. The power flow path will be completed following the same path in the main transmission section 144 (e.g., from the shaft 105 to the output shaft 114) as set forth in Speed 17. Following the power flow path of Speed 20, the gear pairs G1, G3, and G4 are contributing to the total transmission gear ratio.

Shifting from Speed 20 of Range 5 to Speed 21 of Range 6, the clutches E, S2, and 2&5 are disengaged, and the clutches O, S1, and 1&6 are engaged. As such, a triple-clutch swap is performed in the transmission 34; however, only a single-clutch swap is performed in the main transmission section 144. The flow path from the input shaft 104 to the shaft 105 of Speed 21 is identical to that of Speed 1 (e.g., clutches O and S1 are engaged), and hence is not discussed separately here. Since the first input clutch IN2 remains engaged, the first shaft 106 is fixedly coupled to the shaft 105. When the second module clutch 1&6 is engaged, the third module gear 130 of the second module 148 is fixedly coupled to the first shaft 106 such that it rotates with the first shaft 106. Because the fourth module gear 131 of the second module 148 is fixedly coupled to the second shaft 118, the second module gear 131 rotates with the second shaft 118. With the second output clutch H engaged, the second shaft 118 is fixedly coupled to the first shaft 106 through the rotatably coupled third module gear 130 and fourth module gear 131 of the second module 148, such that the second shaft 118 rotates together with the first shaft 106. With the second output clutch H engaged, the output shaft 114 is fixedly coupled to the second shaft 118, such that the output shafts 114 rotates with the second shaft 118 and outputs power to the load 102. Following the power flow path of Speed 21, only the gear pair G5 is contributing to the total transmission gear ratio.

Shifting from Speed 21 to Speed 22, the configuration of clutches in the main transmission section 144 remains the same (e.g., IN2, 1&6, and H are engaged), the odd clutch O is disengaged, the even clutch E is engaged, and the power flow path from the input shaft 104 to the shaft 105 is identical to that set forth above for shifting from Speed 1 to Speed 2. As the first input clutch IN2 is engaged, and the rest of the power flow path of Speed 22 (e.g., from the shaft 105 to the output shaft 114) follows an identical path as set forth above in Speed 21. Following the power flow path of Speed 22, the gear pairs G1, G2, and G5 are contributing to the total transmission gear ratio.

Shifting from Speed 22 to Speed 23, the even clutch E is disengaged, the odd clutch O is engaged, the intermediate clutch S1 is disengaged, the intermediate clutch S2 is engaged, and the power flow path from the input shaft 104 to the shaft 105 is identical to that set forth above for shifting from Speed 10 to Speed 11. The rest of the power flow path will be completed following the same path in the main transmission section 144 (e.g., from the shaft 105 to the output shaft 114), as set forth above in Speed 21. Following the power flow path of Speed 23, the gear pairs G2, G3, and G5 are contributing to the total transmission gear ratio.

Shifting from Speed 23 to Speed 24, the odd clutch O is disengaged, the even clutch E is engaged, and the power flow path from the input shaft 104 to the shaft 105 is identical to that set forth above for shifting from Speed 11 to Speed 12. The rest of the power flow path will be completed following the same path in the main transmission section 144 (e.g., from the shaft 105 to the output shaft 114) as set forth in Speed 21. Following the power flow path of Speed 24, the gear pairs G1, G3, and G5 are contributing to the total transmission gear ratio.

Furthermore, half of the speeds mentioned above may be provided in a reverse direction (e.g., the reverse clutch R is engaged instead of the odd clutch O or the even clutch E, and either the intermediate clutch S1 or the intermediate S2 is engaged to enable two reverse speeds instead of four forward speeds, leading to 12 speeds instead of 24 speeds). For example, power may be provided to the load in a reverse direction by engaging the reverse clutch R. The reverse shaft 134 is driven to rotate by the input shaft 104 through the rotatably coupled gear 122 and gear 138. While the reverse clutch R is engaged, the gear 140 is fixedly coupled to the reversed shaft 134. Accordingly, power is transferred from the reversed shaft 134 to the shaft 103 through the rotatably coupled gears 140, 124, and 125, thereby causing the shaft 103 to rotate in a reverse direction when the intermediate clutch S1 is engaged or causing the shaft the outer countershaft segment 117 to rotate in a reverse direction when the intermediate clutch S2 is engaged.

While only certain features of the invention have been illustrated and described herein, many modifications and changes will occur to those skilled in the art. For example, the configuration of the modules set forth above may be reversed for each oput clutch and output gear configuration. For example, the module clutches may be each or both arranged along the input arrangement or the output arrangement. For example, the input clutches may be each or both arranged along the input arrangement or the output arrangement. For example, the output clutches may be each or both arranged along the input arrangement or the output arrangement. It is, therefore, to be understood that the appended claims are intended to cover all such modifications and changes as fall within the true spirit of the invention.

The invention claimed is:
1. A transmission system for a work vehicle, comprising a transmission comprising:
   a first shaft;
   a second shaft;
   an input shaft
   an output shaft;
   an input gear pair comprising a first input gear and a second input gear;
   a first input clutch configured to selectively couple the input shaft to the first shaft;
   a second input clutch configured to selectively couple the input shaft to the second shaft via the input gear pair;
   an output gear pair comprising a first output gear and a second output gear, wherein the first output gear is coupled to the first shaft, or the second output gear is coupled to the output shaft;
   a first output clutch configured to selectively couple the second output gear to the output shaft if the first output gear is coupled to the first shaft, or to selectively couple the first output gear to the first shaft if the second output gear is coupled to the output shaft;
   a second output clutch configured to selectively couple the second shaft to the output shaft;
   a first module, wherein the first module comprises:
      a first module gear pair comprising a first module gear and a second module gear, wherein the first module gear is coupled to the first shaft, or the second module gear is coupled to the second shaft; and a first module clutch configured to selectively couple the second module gear to the second shaft if the first module gear is coupled to the first shaft, or to selectively couple the first module gear to the first shaft if the second module gear is coupled to the second shaft;

wherein engaging the second input clutch, the first input clutch, and the second output clutch and disengaging the first output clutch establishes a second gear ratio between the input shaft of the transmission and the output shaft, engaging the first input clutch, the first module clutch, and the second output clutch and disengaging the second input clutch establishes a third gear ratio between the input shaft and the output shaft, and the second gear ratio is higher than the third gear ratio.

2. The transmission system of claim 1, comprising a controller communicatively coupled to the transmission, wherein the controller is configured to control the first input clutch, the second input clutch, the first output clutch, the second output clutch, and the first module clutch to establish one of a plurality of gear ratios between the input shaft of the transmission and the output shaft.

3. The transmission system of claim 1, wherein engaging the second input clutch, the first input clutch, and the first output clutch and disengaging the first module clutch establishes a first gear ratio between the input shaft of the transmission and the output shaft, engaging the second input clutch, the first input clutch, and the second output clutch and disengaging the first output clutch establishes a second gear ratio between the input shaft and the output shaft, and the first gear ratio is higher than the second gear ratio.

4. The transmission system of claim 1, comprising second module, wherein the second module comprises:
a second module gear pair comprising a third module gear and a fourth module gear, wherein the third module gear is coupled to the first shaft, or the fourth module gear is coupled to the second shaft; and
a second module clutch configured to selectively couple the fourth module gear to the second shaft if the third module gear is coupled to the first shaft, or to selectively couple the third module gear to the first shaft if the fourth module gear is coupled to the second shaft.

5. A transmission system for a work vehicle, comprising a transmission comprising:
a first shaft;
a second shaft;
an input shaft
an output shaft;
an input gear pair comprising a first input gear and a second input gear;
a first input clutch configured to selectively couple the input shaft to the first shaft;
a second input clutch configured to selectively couple the input shaft to the second shaft via the input gear pair;
an output gear pair comprising a first output gear and a second output gear, wherein the first output gear is coupled to the first shaft, or the second output gear is coupled to the output shaft;
a first output clutch configured to selectively couple the second output gear to the output shaft if the first output gear is coupled to the first shaft, or to selectively couple the first output gear to the first shaft if the second output gear is coupled to the output shaft;
a second output clutch configured to selectively couple the second shaft to the output shaft;
a first module, wherein the first module comprises:

a first module gear pair comprising a first module gear and a second module pear, wherein the first module gear is coupled to the first shaft, or the second module pear is coupled to the second shaft; and
a first module clutch configured to selectively couple the second module gear to the second shaft if the first module gear is coupled to the first shaft, or to selectively couple the first module gear to the first shaft if the second module gear is coupled to the second shaft;
a second module, wherein the second module comprises:
a second module gear pair comprising a third module gear and a fourth module gear, wherein the third module gear is coupled to the first shaft, or the fourth module gear is coupled to the second shaft; and
a second module clutch configured to selectively couple the fourth module gear to the second shaft if the third module gear is coupled to the first shaft, or to selectively couple the third module gear to the first shaft if the fourth module gear is coupled to the second shaft,
wherein engaging the second input clutch, the first module clutch, and the first output clutch and disengaging the second module clutch establishes a fourth gear ratio between the input shaft of the transmission and the output shaft, engaging the second input clutch, the first input clutch, and the first output clutch and disengaging the first module clutch establishes a fifth gear ratio between the input shaft and the output shaft, and the fourth gear ratio is higher than the fifth gear ratio.

6. The transmission system of claim 5, wherein engaging the second input clutch, the first input clutch, and the first output clutch and disengaging the first module clutch establishes a fifth gear ratio between the input shaft of the transmission and the output shaft, engaging the second input clutch, the first input clutch, and the second output clutch and disengaging the first output clutch establishes a sixth gear ratio between the input shaft and the output shaft, and the fifth gear ratio is higher than the sixth gear ratio.

7. The transmission system of claim 5, wherein engaging the second input clutch, the first input clutch, and the second output clutch and disengaging the first output clutch establishes a sixth gear ratio between the input shaft of the transmission and the output shaft, engaging the first input clutch, the first module clutch, and the second output clutch and disengaging the second input clutch establishes a seventh gear ratio between the input shaft and the output shaft, and the sixth gear ratio is higher than the seventh gear ratio.

8. The transmission system of claim 5, wherein engaging the first input clutch, the first module clutch, and the second output clutch and disengaging the second input clutch establishes a seventh gear ratio between the input shaft of the transmission and the output shaft, engaging the first input clutch, the second module clutch, and the second output clutch and disengaging the first module clutch establishes a eighth gear ratio between the input shaft and the output shaft, and the seventh gear ratio is higher than the eighth gear ratio.

9. A transmission system for a work vehicle, comprising a transmission comprising:
a first shaft;
a second shaft;
an input shaft;
an output shaft;
an input gear pair comprising a first input gear and a second input gear;

a first input clutch configured to selectively couple the input shaft to the first shaft;
a second input clutch configured to selectively couple the input shaft to the second shaft via the input gear pair;
an output gear pair comprising a first output gear and a second output gear, wherein the first output gear is coupled to the first shaft;
a first output clutch configured to selectively couple the second output gear to the output shaft;
a second output clutch configured to selectively couple the second shaft to the output shaft; and
a first module comprising a first module clutch and a first module gear pair having a first module gear and a second module gear, wherein the first module gear is coupled to the first shaft and the first module clutch is configured to selectively couple the second module gear to the second shaft, or the second module gear is coupled to the second shaft and the first module clutch is configured to selectively couple the first module gear to the first shaft;
wherein engaging the second input clutch, the first module clutch, and the first output clutch and disengaging a second module clutch establishes a first gear ratio between the input shaft of the transmission and the output shaft, engaging the second input clutch, the first input clutch, and the first output clutch and disengaging the first module clutch establishes a second gear ratio between the input shaft and the output shaft, and the first gear ratio is higher than the second gear ratio.

10. The transmission system of claim 9, comprising a transmission control system communicatively coupled to the transmission, wherein the transmission control system is configured to disengaging and engaging different clutches to establishing different gear ratios between the input shaft of the transmission and the output shaft.

11. The transmission system of claim 9, comprising second module, wherein the second module comprises:
a second module gear pair comprising a third module gear and a fourth module gear, wherein the third module gear is coupled to the first shaft, or the fourth module gear is coupled to the second shaft; and
a second module clutch configured to selectively couple the fourth module gear to the second shaft if the third module gear is coupled to the first shaft, or to selectively couple the third module gear to the first shaft if the fourth module gear is coupled to the second shaft.

12. A transmission system for a work vehicle, comprising a transmission comprising:
a first shaft;
a second shaft;
an input shaft;
an output shaft;
an input gear pair comprising a first input gear and a second input gear;
a first input clutch configured to selectively couple the input shaft to the first shaft;
a second input clutch configured to selectively couple the input shaft to the second shaft via the input gear pair;
an output gear pair comprising a first output gear and a second output gear, wherein the first output gear is coupled to the first shaft;
a first output clutch configured to selectively couple the second output gear to the output shaft;
a second output clutch configured to selectively couple the second shaft to the output shaft; and
a first module comprising a first module clutch and a first module gear pair having a first module gear and a second module gear, wherein the first module gear is coupled to the first shaft and the first module clutch is configured to selectively couple the second module gear to the second shaft, or the second module gear is coupled to the second shaft and the first module clutch is configured to selectively couple the first module gear to the first shaft,
wherein engaging the second input clutch, the first input clutch, and the first output clutch and disengaging the first module clutch establishes a second gear ratio between the input shaft of the transmission and the output shaft, engaging the second input clutch, the first input clutch, and the second output clutch and disengaging the first output clutch establishes a third gear ratio between the input shaft and the output shaft, and the second gear ratio is higher than the third gear ratio.

13. The transmission system of claim 12, wherein engaging the second input clutch, the first input clutch, and the second output clutch and disengaging the first output clutch establishes a third gear ratio between the input shaft of the transmission and the output shaft, engaging the first input clutch, the first module clutch, and the second output clutch and disengaging the second input clutch establishes a fourth gear ratio between the input shaft and the output shaft, and the third gear ratio is higher than the fourth gear ratio.

14. The transmission system of claim 12, wherein engaging the first input clutch, the first module clutch, and the second output clutch and disengaging the second input clutch establishes a fourth gear ratio between the input shaft of the transmission and the output shaft, engaging the first input clutch, the second module clutch, and the second output clutch and disengaging the first module clutch establishes a fifth gear ratio between the input shaft and the output shaft, and the fourth gear ratio is higher than the fifth gear ratio.

15. A transmission system for a work vehicle, comprising a transmission comprising:
a first shaft;
a second shaft;
an input shaft;
an output shaft;
an input gear pair comprising a first input gear and a second input gear;
a first input clutch configured to selectively couple the input shaft to the first shaft;
a second input clutch configured to selectively couple the input shaft to the second shaft via the input gear pair;
an output gear pair comprising a first output gear and a second output gear, wherein the second output gear is coupled to the output shaft;
a first output clutch configured to selectively couple the first output gear to the first shaft;
a second output clutch configured to selectively couple the second shaft to the output shaft; and
a module comprising a module clutch and a module gear pair having a first module gear and a second module gear, wherein the first module gear is coupled to the first shaft and the module clutch is configured to selectively couple the second module gear to the second shaft, or the second module gear is coupled to the second shaft and the module clutch is configured to selectively couple the first module gear to the first shaft;
wherein engaging the second input clutch, the first input clutch, and the second output clutch and disengaging the first output clutch establishes a second gear ratio between the input shaft of the transmission and the output shaft, engaging the first input clutch, the module clutch, and the second output clutch and disengaging the second output clutch establishes a third gear ratio between the input shaft and the output shaft, and the second gear ratio is higher than the third gear ratio.

16. The transmission system of claim 15, comprising a controller communicatively coupled to the transmission, wherein the controller is configured to control the first input clutch, the second input clutch, the first output clutch, the second output clutch, and the module clutch to establish one of a plurality of gear ratios between the input shaft of the transmission and the output shaft.

17. The transmission system of claim 15, wherein engaging the second input clutch, the first input clutch, and the first output clutch and disengaging the module clutch establishes a first gear ratio between the input shaft of the transmission and the output shaft, engaging the second input clutch, the first input clutch, and the second output clutch and disengaging the first output clutch establishes a second gear ratio between the input shaft and the output shaft, and the first gear ratio is higher than the second gear ratio.

* * * * *